US011395089B2

(12) United States Patent
Prasso

(10) Patent No.: US 11,395,089 B2
(45) Date of Patent: Jul. 19, 2022

(54) MIXING AUDIO BASED ON A POSE OF A USER

(71) Applicant: Google LLC, Mountain View, CA (US)

(72) Inventor: Luca Prasso, San Mateo, CA (US)

(73) Assignee: Google LLC, Mountain View, CA (US)

( * ) Notice: Subject to any disclaimer, the term of this patent is extended or adjusted under 35 U.S.C. 154(b) by 53 days.

(21) Appl. No.: 15/733,512

(22) PCT Filed: May 6, 2019

(86) PCT No.: PCT/US2019/030925
§ 371 (c)(1),
(2) Date: Aug. 17, 2020

(87) PCT Pub. No.: WO2019/217320
PCT Pub. Date: Nov. 14, 2019

(65) Prior Publication Data
US 2020/0389754 A1   Dec. 10, 2020

Related U.S. Application Data

(60) Provisional application No. 62/668,782, filed on May 8, 2018.

(51) Int. Cl.
H04S 7/00       (2006.01)
G06T 7/73       (2017.01)
G06F 3/01       (2006.01)
H04N 21/442     (2011.01)

(52) U.S. Cl.
CPC ............. H04S 7/304 (2013.01); G06F 3/013 (2013.01); G06T 7/74 (2017.01); H04N 21/44218 (2013.01); H04S 2400/13 (2013.01)

(58) Field of Classification Search
CPC combination set(s) only.
See application file for complete search history.

(56) References Cited

U.S. PATENT DOCUMENTS

| 2013/0041648 | A1  | 2/2013  | Osman |
| 2014/0328505 | A1  | 11/2014 | Heinemann et al. |
| 2015/0128075 | A1* | 5/2015  | Kempinski ............ G06F 3/013 715/765 |

(Continued)

FOREIGN PATENT DOCUMENTS

| CN | 102823272 A | 12/2012 |
| CN | 103218198 A | 7/2013 |

(Continued)

OTHER PUBLICATIONS

International Search Report and Written Opinion for International Application No. PCT/US2019/030925, dated Jun. 26, 2019, 14 pages.

(Continued)

*Primary Examiner* — Duc Nguyen
*Assistant Examiner* — Assad Mohammed
(74) *Attorney, Agent, or Firm* — Brake Hughes Bellermann LLP

(57) ABSTRACT

A system, apparatus, and method are disclosed for utilizing a sensed pose of a user to dynamically control the mixing of audio tracks to provide a user with a more realistic, informative, and/or immersive audio experience with a virtual environment, such as a video.

18 Claims, 9 Drawing Sheets

(56) References Cited

U.S. PATENT DOCUMENTS

| | | | |
|---|---|---|---|
| 2015/0172539 A1* | 6/2015 | Neglur | H04N 5/23245 |
| | | | 348/222.1 |
| 2015/0382130 A1 | 12/2015 | Connor et al. | |
| 2017/0078825 A1* | 3/2017 | Mangiat | G06F 3/012 |
| 2017/0109131 A1 | 4/2017 | Boesen | |
| 2018/0020963 A1* | 1/2018 | Friant | A61B 5/6801 |
| | | | 705/14.66 |
| 2018/0329672 A1* | 11/2018 | Sadak | G06F 1/1677 |
| 2018/0359592 A1* | 12/2018 | Laaksonen | H04S 3/008 |

FOREIGN PATENT DOCUMENTS

| | | |
|---|---|---|
| CN | 105872928 A | 8/2016 |
| WO | 2017048713 A1 | 3/2017 |
| WO | 2018026828 A1 | 2/2018 |

OTHER PUBLICATIONS

First Office Action for Chinese Application No. 201980022105.8 (with English Translation), dated Oct. 9, 2021, 22 pages.

\* cited by examiner

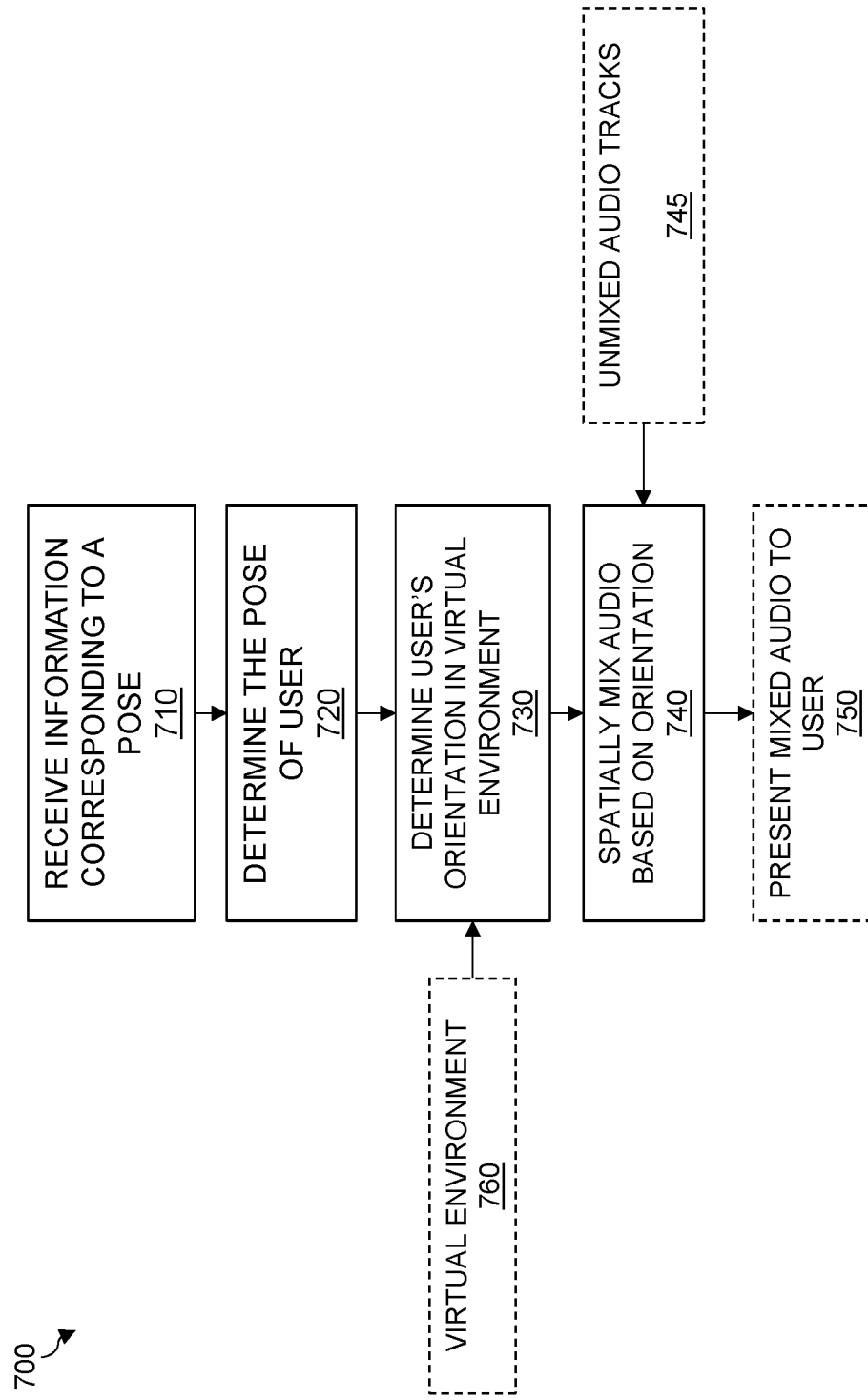

MIXING AUDIO BASED ON A POSE OF A USER

CROSS-REFERENCE TO RELATED APPLICATIONS

This application is a 35 U.S.C. § 371 National Phase Entry Application from PCT/US2019/030925, filed on May 6, 2019, entitled "MIXING AUDIO BASED ON A POSE OF A USER", which claims the benefit of U.S. Provisional Patent Application No. 62/668,782, filed on May 8, 2018, the disclosures of which are incorporated herein by reference in their entireties.

TECHNICAL FIELD OF THE DISCLOSURE

The present disclosure relates to audio mixing and more specifically to dynamically mixing audio played on a device according to a user's interaction with the device.

BACKGROUND

Computing devices (e.g., smartphones, tablets, smart TV's, laptops, virtual assistants, etc.) may be configured by applications (i.e., apps) to play audio associated with a virtual environment. Virtual environments may include, for example, movie, navigation, or game environments. The audio presented with these virtual environments may appear to a user as lacking immersive or interactive qualities.

SUMMARY

In one general aspect, the disclosure describes a method for mixing audio. In the method, media content (e.g., a video) containing unmixed audio tracks are received. Additionally, information (e.g., at least one image of a user) is received from at least one sensor. Based on the information from the at least one sensor, a pose of the user is then determined and used as the basis for adjusting an audio mixer. The unmixed audio tracks are applied to the adjusted audio mixer to create mixed audio for the media content, which is then presented to the user (e.g., via equipment of the user).

In a possible implementation, the pose of a user can include a relative position or a relative orientation between the user and the equipment of the user (e.g., a display). Alternatively or additionally, the pose of a user can include an expression or a movement of the user.

In a possible implementation, the audio mixer may include an audio channel for each unmixed audio track, and each audio channel of the mixer can be adjustable to control at least one characteristics of the applied unmixed audio track (i.e., before they are combined into mixed audio). One possible characteristic of an unmixed audio track is a volume. Another possible characteristic of an unmixed audio track is a spectral profile (i.e., equalizer profile, filter profile).

In a possible implementation, the method is repeated (i.e., continuously) so that the mixed audio of the media content responds to (i.e., is updated based on) changes in the pose of the user (e.g., in real time) as the media content is played.

In another general aspect the disclosure describes a system. The system includes at least one sensor, which is configured to receive (e.g., receives) information corresponding to a user. The system further includes a processor that is communicatively coupled to the at least one sensor and is configured (e.g., by software instructions) to perform a method for creating mixed audio. The mixed audio may be for the video. In the method, unmixed audio tracks (optionally associated with a video) are received and applied to an audio mixer to create mixed audio. The audio mixer is adjusted based on a pose that is determined from the information corresponding to the user received by the at least one sensor.

In a possible implementation the system further includes a display and a sound device (e.g., head set, surround sound system, sound bar, etc.) that the video with the mixed audio is transmitted to for presentation to a user.

The at least one sensor may be implemented variously. In one possible implementation the at least one sensor includes a camera of a mobile device (e.g., mobile phone, tablet, laptop). In another possible implementation, the at least one sensor includes a camera of a home security system or a camera of a smart home system (e.g., a virtual assistant). In another possible implementation, the at least one sensor includes a camera of smart glasses worn by the user. In another possible implementation, the at least one sensor includes a depth sensor (e.g., structured light sensor, time of flight sensor, etc.).

In another general aspect the disclosure describes a computing device. The computing device includes an audio interface that is coupled to a sound system (e.g., headset). The computing device further includes a display and a camera that is configured to capture at least one image of a user. The computing device also includes a processor that is communicatively coupled to the audio interface, the display, and the camera. The processor is configured (e.g., by software instructions) to perform a method for presenting the video with audio mixed according to a pose of the user. In the method, unmixed audio tracks associated with a video are received. Additionally, a pose of the user is determined from the at least one image of user captured by the camera. Based on the determined pose, an audio mixer is adjusted. The unmixed audio tracks are applied to the adjusted audio mixer to create mixed audio for the video. The video and the mixed audio are transmitted to the display and the sound system.

A pose may be determined variously. In one possible implementation, determining the pose of the user includes determining a relative distance between the user and the display. In another possible implementation, determining the pose of the user includes determining a position of a gaze of the user with respect to a position of an object with the video.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 8 is a flow chart of a method for mixing audio based on a pose of a user according to an implementation of the present disclosure.

Like reference symbols in the various drawings indicate like elements.

DETAILED DESCRIPTION

Media content (e.g., television, movie, and video) is typically consumed much as it has been for years. A director may shoot/edit video scenes and record/mix the audio to create a media product that, depending on the environment, can be immersive for the viewer. Foreknowledge of the sound system and the screen that a user will view the media content with allows a creator (e.g., director) to customize the recording/mixing of the audio and the shooting/editing of the video to enhance the immersive experience. If a user chooses to view the content in a different environment or with difference equipment, then the intended immersive experience may be diminished. Additionally, the extent of the realism may be limited by the inherent assumptions about the viewer that are required for this process. For example, media content (i.e., media) may be distributed with premixed audio that provides a maximally immersive experience only when the user and the audio system are in a predetermined arrangement, such as a seated user facing the screen and surrounded by speakers in a surround sound system. The present disclosure describes systems and methods to enhance the experience of consuming media for a user by customizing the audio mix of the media based on the user (e.g., a pose of the user) and the user's environment (e.g., equipment type/arrangement).

Figure 1:
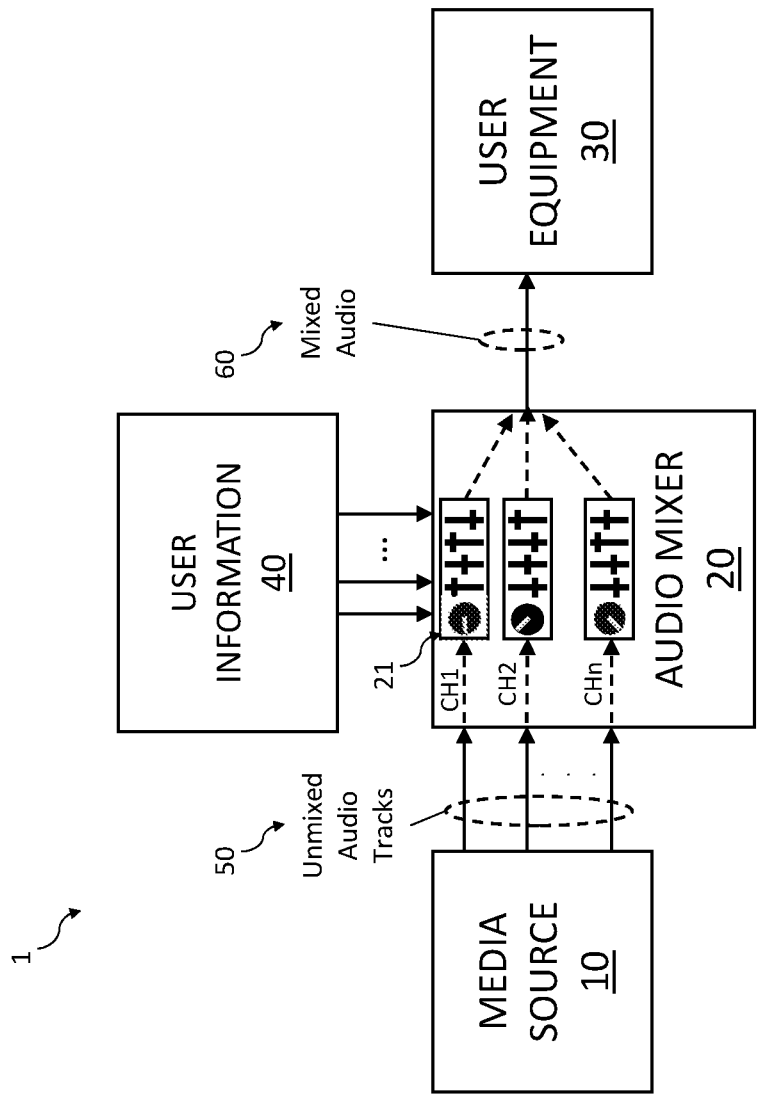
FIG. 1 is a block diagram of mixing audio according to a possible implementation of the present disclosure.

FIG. 1 is a block diagram of a system 1 for mixing audio according to an implementation of the disclosed techniques. As shown, a media source may provide media content containing unmixed audio tracks 50 to an audio mixer 20. The media source 10 may serve multiple users. For example, the media source may be a video server on the internet or a television station on a cable television network that provides different users same unmixed audio. Alternatively, the media source may serve a single user. For example, the media source may a computer readable memory (e.g., hard drive, DVD, etc.). In either case, the unmixed tracks 50 are received at an audio mixer 20. Each unmixed audio track can represent a sound source in a virtual environment represent in the media content. For example, in a video with two speakers, an unmixed audio track may be included for each speaker.

The unmixed audio tracks received by a particular user may be mixed (e.g., in real time) by the audio mixer 20 according to information that is particular to user (i.e., user information 40) to produce mixed audio 60. The audio mixer 20 may include a channel (e.g., CH1, CH2, CHn) for each unmixed audio track, and the mixing process may include adjusting one or more characteristics (e.g., volume, filtering, noise reduction, etc.) of each unmixed audio track prior to combining the unmixed tracks 50 into mixed audio 60. For example, each channel may effectively include a channel processor 21 with a volume control to adjust the amplitude of a particular unmixed audio track and an equalizer to adjust a spectral profile of a particular unmixed audio track. After the adjustments, the unmixed audio tracks 50 may be combined into a mixed audio 60. The mixed audio includes tracks from all sound sources in the media content. The mixed audio may be configured in a variety of formats suitable for listening on a particular sound system (e.g., stereo, surround sound, etc.).

As mentioned, the mixed audio 60 combines adjusted (e.g., amplified, attenuated, filtered, etc.) versions of the unmixed audio tracks 50. While multiple users may receive the same unmixed audio tracks 50 from a media source, the mixed audio can be different (i.e., customized) for each user. Further, the customized audio mixing for each user is not static and may change during the presentation of the media content.

The mixed tracks 60 are presented to a user on equipment of the user (i.e., user equipment 30). The user equipment may include devices for presenting audio (e.g., sound system, headphones, speaker etc.) and devices for presenting video (e.g., display, projector, smart glasses, VR headset, etc.). In a possible implementation, information regarding the user equipment 30 may be passed to the audio mixer. For example, in a possible implementation, the user information includes information corresponding to the user equipment 30.

The media source 10, the audio mixer 20, and the user equipment 30 may be embodied as a single device or may constitute multiple devices. For example, the media source 10 may be a server operating in a first location, the audio mixer 20 may be software running on a processor in a second location, and the media display 30 may be a display (e.g., television) operating in the third location. Alternatively, the media source 10, the audio mixer 20, and the media display 30 may be embodied in a single device (e.g., smartphone, tablet, etc.) or could be embodied by multiple devices (e.g., tablet and coupled headphones) operating in the same location (e.g., BLUETOOTH™ coupled devices). The present disclosure envisions any combination of devices and distribution of processes to achieve the customized mixing of audio (e.g., audio data) based on one or more elements of user information 40.

The user information 40 includes elements of information to help the audio mixer adjust characteristics (e.g., volume, filtering, etc.) of each unmixed audio track so that the mixed audio can (i) provide a more realistic and/or immersive audio experience and/or (ii) provide aspects that seem controlled by the user. The user information 40 may include a pose of the user. The pose of the user can include a relative position and/or orientation between a user and a viewing device presenting a visual portion of the media content to the user. The pose may contain information corresponding to an orientation (e.g., a relative or an absolute orientation) of the user and/or an orientation the viewing device (e.g., display). Additionally, or alternatively, the pose may also contain information corresponding to a movement (e.g., gesture) of the user. Additionally or alternatively, the pose may contain information corresponding to an expression (e.g., gaze) of the user. A change in all, or part, of a pose can cause a corresponding change in the audio mixing.

A pose of a user may be determined using at least one (i.e., one or more) sensors. In a possible implementation, a sensor may have a processor to determine a pose, while in another possible implementation; a sensor may collect and transmit raw pose-data for analysis by an external processor. In a possible implementation, a sensor may gather all data necessary to determine a pose, while in another possible implementation; multiple sensors may each gather a portion of the data necessary to determine a pose. In another possible implementation, the one or more sensors may also include duplicate sensors (e.g., spaced apart).

The one or more sensors may include a remote sensor. A remote sensor observes a user and/or the user equipment from a distance. In possible implementations, a remote sensor can be a camera (e.g., RGB camera, IR camera) or a depth sensor (e.g., structured light sensor, time of flight sensor, LIDAR, etc.). Additionally, or alternatively, the one or more sensors may include a contiguous sensor. A contiguous sensor observes a user and/or user equipment while in contact (e.g., carried) with the user. In a possible implementation, a contiguous sensor may include positional sensor (e.g., an X, Y, and/or Z accelerometer, a GPS sensor, etc.).

The one or more sensors may be integrated with a user (e.g., worn by the user), integrated with equipment of the user, or both. For example, a front facing camera of a television or mobile device (e.g., tablet, smartphone, etc.) may be used to sense a pose of user. Alternatively or additionally, the one or more sensors may be integrated (or combined) with another device or system, such as a virtual assistant or other device of a smart home system (e.g., smart thermostat, smart refrigerator, security camera, etc.). For example, a camera monitoring a room in a home security system may sense the pose of a user relative to user equipment (e.g., television, speaker, etc.). In another example, a body worn device (e.g., smart glasses) may determine the pose of a user relative to a device of a user.

Determining a pose of the user relative to the display device can help create an immersive audio experience for a displayed virtual environment (i.e., video). In a displayed virtual environment, various sound sources are spatially arranged. Once the pose of the user is known relative to the display device, then user's virtual position relative to the sound sources in the video may be derived. This spatial information can then be used to mix the audio. For example, if a user moves very close to a sound source on the display, then the mixer may amplify the track of that sound source and attenuate the volume of all other tracks. This mixing may contribute a sense of realism to the virtual environment. In some cases, the mixing can also contribute to a sense of control over the virtual environment. For example, a pose of a user (e.g., walking away from the display device) may control the audio (e.g., shut it off).

A virtual environment presented in media may include an audio and a visual presentation resulting from an application running on a computing device. Possible applications may include, but are not limited to, applications for navigation, video viewing, virtual assistance, augmented reality, and games. The sounds created by the applications are presented to the user in a particular way to create a realistic, informative, and immersive experience. For example, background sounds may have a lower intensity than foreground sounds. Producing audio to provide a user with a realistic impression of a virtual environment is known as spatial mixing. The realistic impression created by spatial mixing may be limited, however, when the spatial mixing of the audio is static and does not respond to a user's pose. Accordingly, the present disclosure relates to spatial mixing of audio associated with a virtual environment that is dynamically controlled based on a user's pose to enhance the user's audio experience by producing a more realistic, informative, and immersive audio experience. While a single user is described it is envisioned that the disclosure can be applied multiple users. Additionally, while a virtual environment corresponding to a video is described it is envisioned that the disclosure may be applied other virtual environments (e.g., virtual reality, augmented reality).

Figure 2:
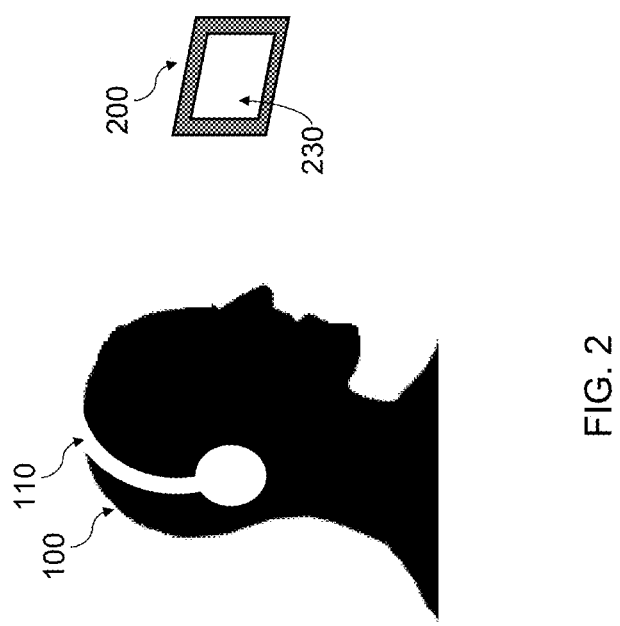
FIG. 2 depicts a user interacting with a virtual environment according to a possible implementation of the present disclosure.

FIG. 2 graphically depicts a user interacting with a virtual environment. As shown, a user 100 can view visual aspects of the virtual environment via a display 230 on a computing device 200. The user may also hear sounds from the virtual environment via a sound device 110. The sound device may be embodied as headphones, earbuds, speakers, or the like. The sound device typically requires two or more sound producing elements to provide the user with spatially mixed (e.g., stereo, surround sound, etc.) audio to provide the user with a sense that the sounds are emitted from locations within the virtual environment. For example, audio from an object (e.g., virtual actors, characters, atmospheric elements, etc.) on the left side of the display may be presented to a user's left ear in amplitude and/or timing that is different from the audio presented to the right ear of the user. In some cases, audio from objects not appearing on the screen (i.e., background sounds) may also be presented to a user. For example, the user may experience sounds that appear to emanate from behind the user.

Spatial (audio) mixing adjusts the amplitude, timing, and/or frequencies of the audio to provide this three dimensional experience. Spatial mixing may be achieved via a hardware and/or a software embodied audio mixer, which can adjust qualities associated with the audio (e.g., audio over multiple channels) according to the virtual environment. The disclosed audio mixer additionally responds to feedback (i.e., user information) corresponding to the user's pose and the resulting orientation of the user within the virtual environment to provide dynamic spatial mixing based on the pose of the user.

Figure 3:
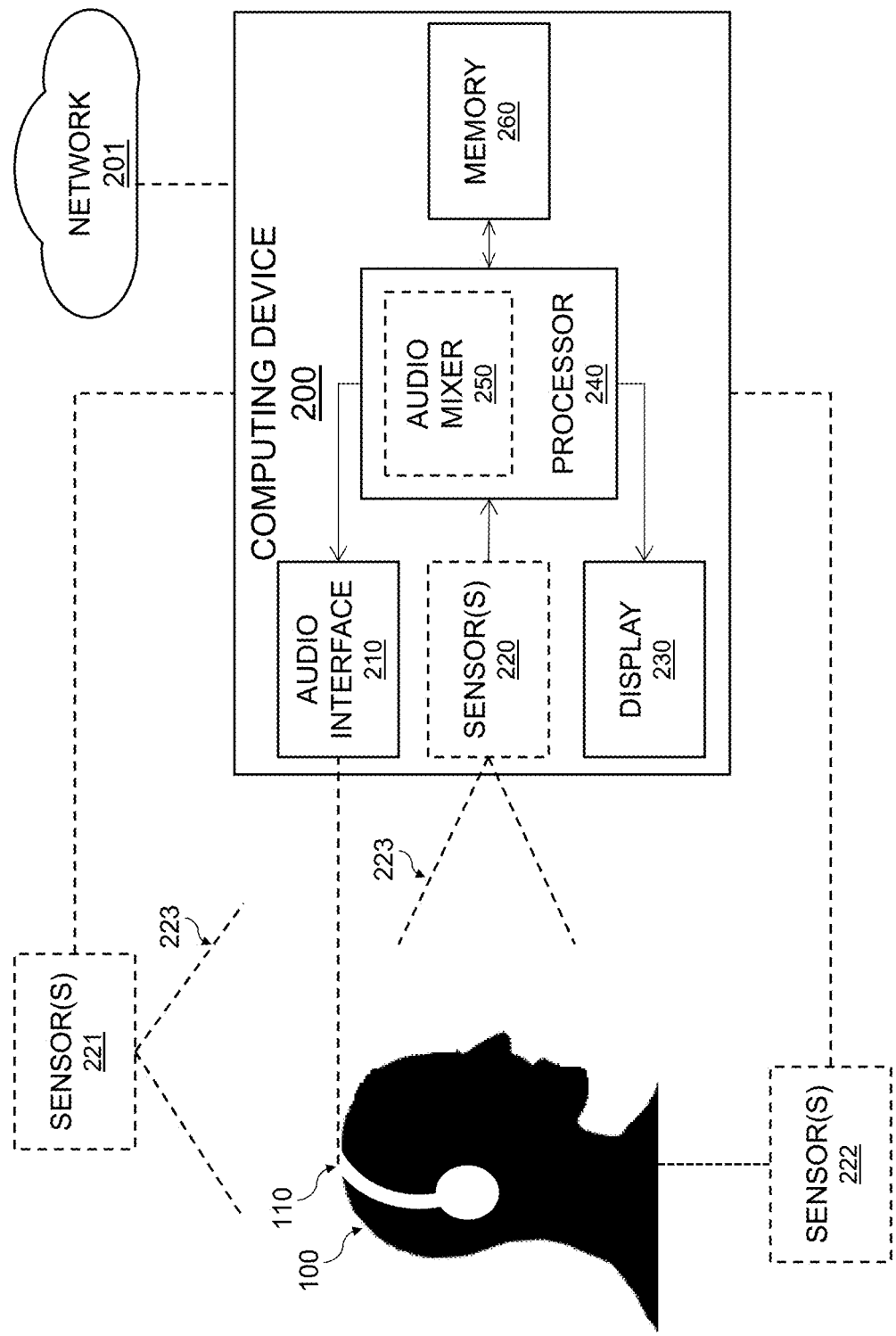
FIG. 3 schematically depicts a system for mixing audio based on a pose of a user according to an implementation of the present disclosure.

FIG. 3 schematically depicts an implementation of the system for mixing audio shown in FIG. 1. The system can include a computing device 200 (e.g., smartphone, tablet, virtual assistant, smart TV, computer, laptop, etc.). The computing device 200 may include a processor 240 and a memory 260. The processor 240 may be configured by software applications stored in a memory 260 to run applications that provide visual aspects of a virtual environment to a display 230 and provide audio aspects of the virtual environment to an audio interface 210, which in turn, can be connected (e.g., wired or wirelessly) to a sound device 110 of a sound system. The computing device 200 may also include one or more sensors 220 (e.g., a camera, depth sensors, etc.) that capture information (e.g., an image, video, depth information, etc.) corresponding to a pose (e.g., head position, eye position, etc.) of a user 100 (e.g., while the user is viewing the display). The system may also include one or more sensors 221 that are physically separate from (but communicatively coupled to) the computing device 200 to sense and gather user information. The system may also include one or more sensors 222 that are possessed (e.g., worn, carried) by a user to sense and gather user information.

The system also includes an audio mixer 250 that processes audio (i.e., spatially mixes the audio) to create a three dimensional (3D) effect. The audio mixer 250 may adjust the spatial mixing of the audio dynamically (e.g., in real time) based on changes to the virtual environment (e.g., the action in a movie). Additionally, the present disclosure discloses an audio mixer 250 that dynamically adjusts the mixing (e.g., spatial mixing) of the audio based on input (i.e., feedback) from the one or more sensors 220. For example, a pose (or movements) of a user within a field of view 223 of a sensor may be sensed (e.g., imaged) to adjust the spatial mix of the sounds presented to the user. The system may be connected to a network 201 from which it may receive media content and with which it may interact to perform one or more operations of the audio mixing.

Figure 4:
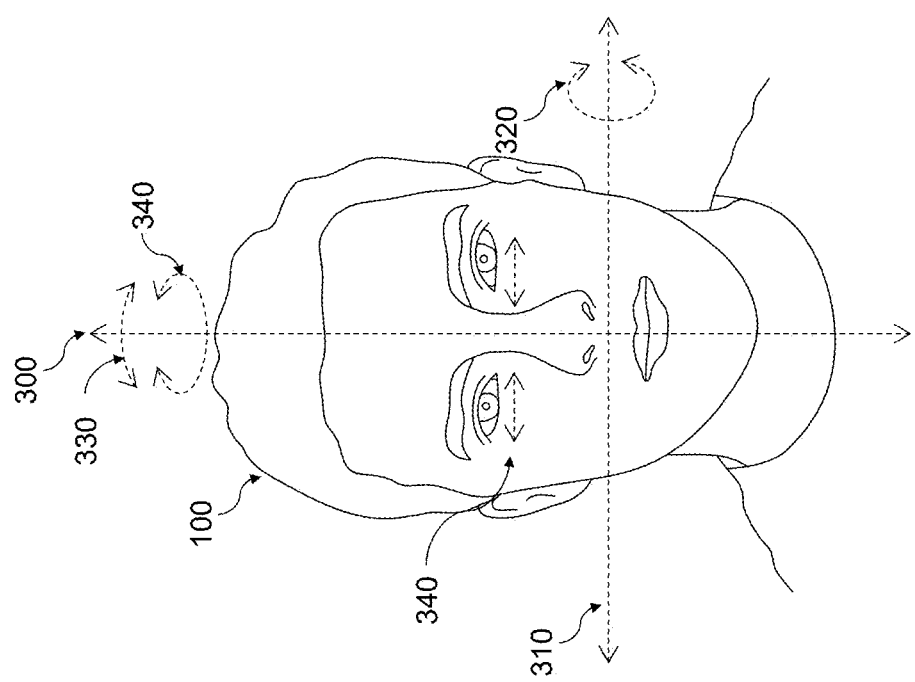
FIG. 4 graphically depicts characteristics of a pose of a user in accordance with some possible implementations of the present disclosure.

FIG. 4 graphically illustrates example pose characteristics that may be determined by the processor 240 (e.g., based on one or more images captured by a sensor). As shown, a pose of a user 100 may be determined by the position of the user's head. For example, the head may be turned left or right 340 about a vertical axis 300. The head may also be tilted left or right 330 relative to the vertical axis 300. The head may also be nodded up or down 320 about a horizontal axis 310. Additionally, the position of the eyes 340 of the user may detected by analyzing the one or more images captured by the camera. The apparent size of the user's head may change as the user moves closer to or away from the camera. This change in distance between the user and the computing device may also be interpreted by the processor as a change in pose.

In a possible implantation it may be possible to determine an area of the display that is the focus of the user's attention based on a detected position of the eyes in relation to the virtual environment displayed. Accordingly, it may be possible to adjust the spatial mixing to change (e.g., increase volume) of sounds (i.e., audio tracks) of objects corresponding to this area of focus within the virtual environment.

In general, the present disclosure is not limited to the poses shown in FIG. 4. The processor may identify other poses and/or changes to a pose to adjust the spatial mixing of audio. Additionally, it is envisioned that the processor may be configured to identify a user's environment (e.g., night/day, inside/outside, etc.) based on the image(s) captured by the camera as a means for adjusting the spatial mix. Additionally, the audio mixer may also use other sensors of the computing device to adjust the spatial mixing. For example, a user's geographic location in a navigation environment may be sensed and used to adjust the spatial mixing (e.g., left turn audio indication is presented on the left side of a user).

Figure 5:
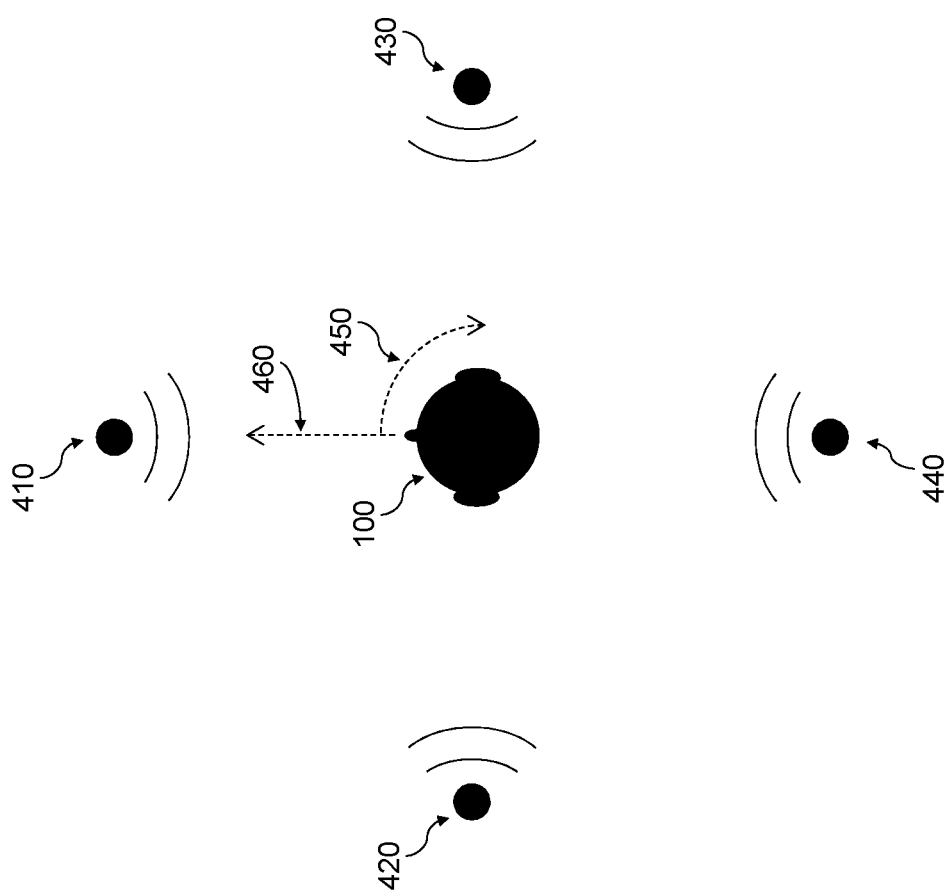
FIG. 5 graphically depicts a perceived orientation of a user relative to sound emitters in a virtual environment in accordance with a possible embodiment of the present disclosure.

FIG. 5 graphically depicts an example of dynamic spatial mixing according to a pose of a user and the resulting perceived orientation relative an audio virtual environment. In the audio virtual environment, a user 100 perceives a virtual front sound source 410, a virtual left sound source 420, a virtual right sound source 430, and a virtual rear sound source 440. In static spatial mixing, the spatial mix of sounds presented to a user is independent of a pose of the user. If a user moves the audio virtual environment stays the same. Instead the disclosed techniques are directed towards dynamic spatial mixing.

In dynamic spatial mixing, a user's pose (e.g., orientation) within an audio virtual environment is determined and used to generate/update the spatial mix of sounds. For example, if the processor determines a pose change including a movement towards 460 the virtual front sound source 410 then the audio mixer may increase the amplitude of the virtual front sound source 410 while decreasing the amplitudes of the other sound sources. In another example, if the processor determines a pose change that includes the user's head being turned 450 to face the virtual right sound source 430 then the audio mixer may change the spatial orientation of the virtual sound sources to match the new pose. For example, as shown in FIG. 4, after the head is turned 450 the virtual front/rear sound sources can be adjusted by the audio mixer to appear to be emanating from the left/right of the user.

Figure 6A:
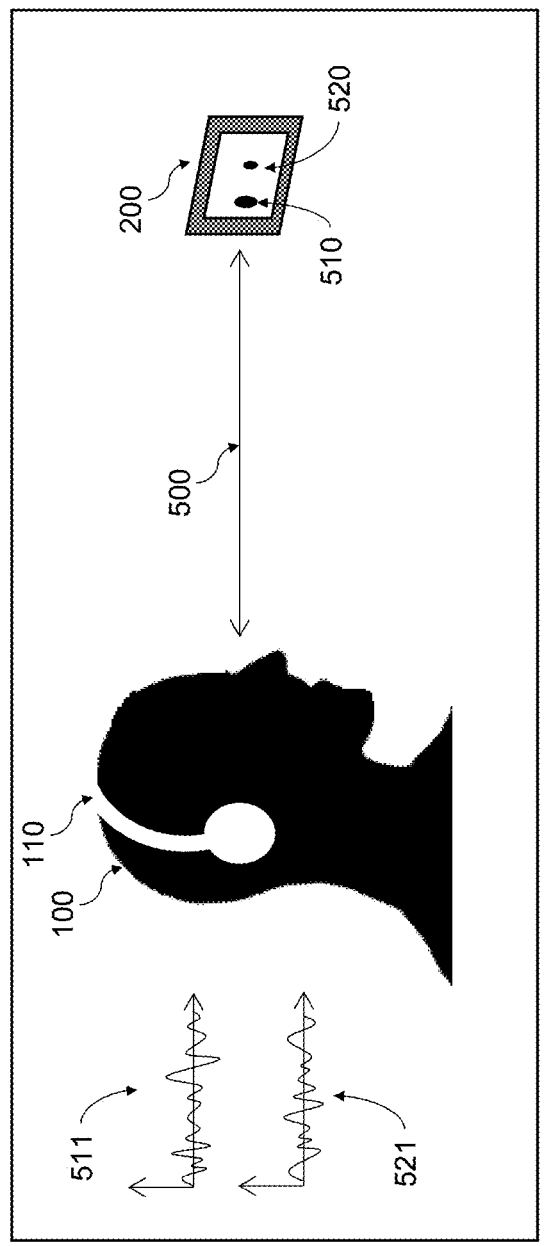
FIGS. 6A and 6B graphically illustrate the effect of a changing pose (i.e., the distance of a user) on the mixing of audio tracks from a first object and a second object in a virtual environment according to an implementation of the present disclosure.
Figure 6B:
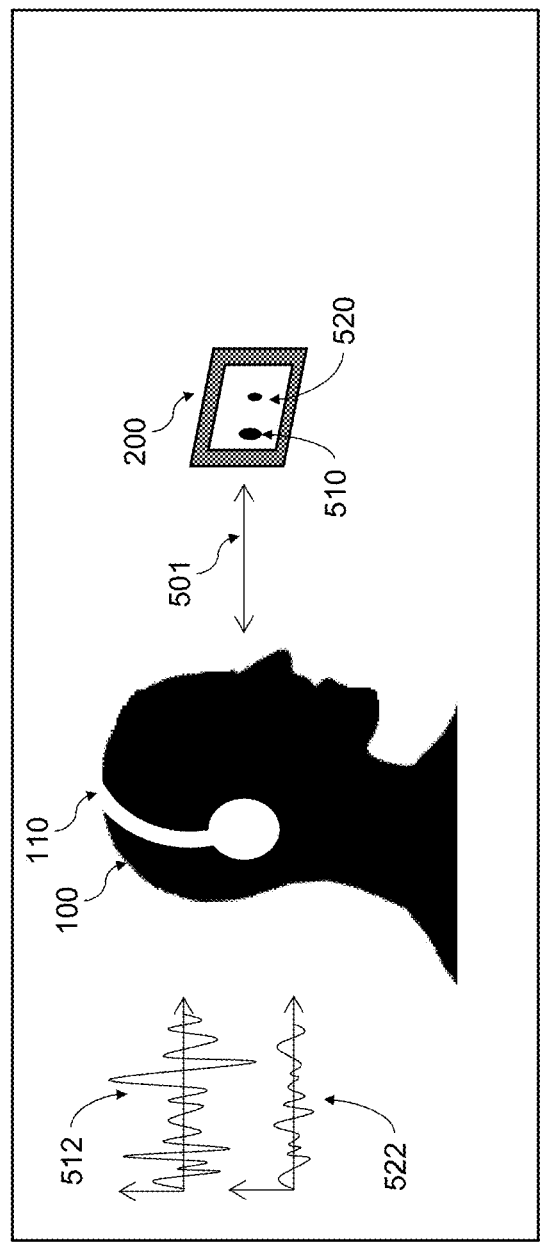

FIGS. 6A and 6B graphically illustrate an example including the effect of a change in user pose on the spatially mixed audio signals from a first object 510 and a second object 520 in a virtual environment displayed to a user 100 on a computing device 200. In this case, the user's pose is related to the distance between the user 100 and the computing device 200, or more particularly the distance between the user 100 and an object within the virtual environment.

As shown in FIG. 6A, the user is located at a first distance 500 from the computing device. The first distance 500 is relatively large. As a result, the relative difference in distances between the user 100 and the first object 510 and between the user 100 and the second object 520 is small. Accordingly, audio from the virtual environment may be spatially mixed so that a first audio signal 511 from the first object 510 is transmitted by the sound device 110 at approximately the same amplitude as a second audio signal 521 from the second object 520.

As shown in FIG. 6B, the user is located at a second distance 501 from the computing device that is smaller (i.e., closer) than the first distance 500. In this case, the relative difference in distances between the user 100 and the first object 510 and between the user 100 and the second object 520 is more significant. Accordingly, the audio from the virtual environment may be spatially mixed so that a first audio signal 512 from the first object is transmitted by the sound device 110 at an amplitude that is higher than the second audio signal 522 from the second object.

Figure 7A:
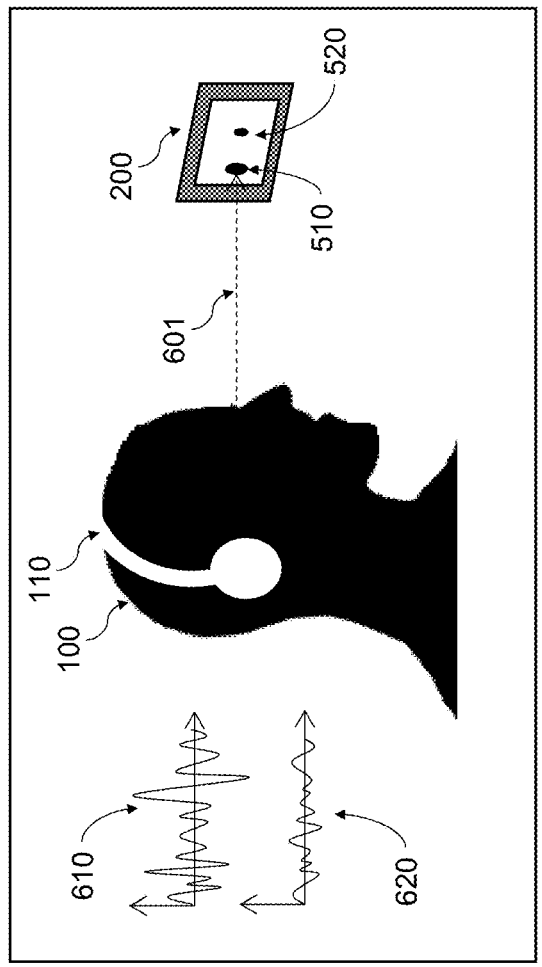
FIGS. 7A and 7B graphically illustrate the effect of a changing pose (i.e., the gaze of a user) on the mixing of audio tracks from a first object and a second object in a virtual environment according to an implementation of the present disclosure.
Figure 7B:
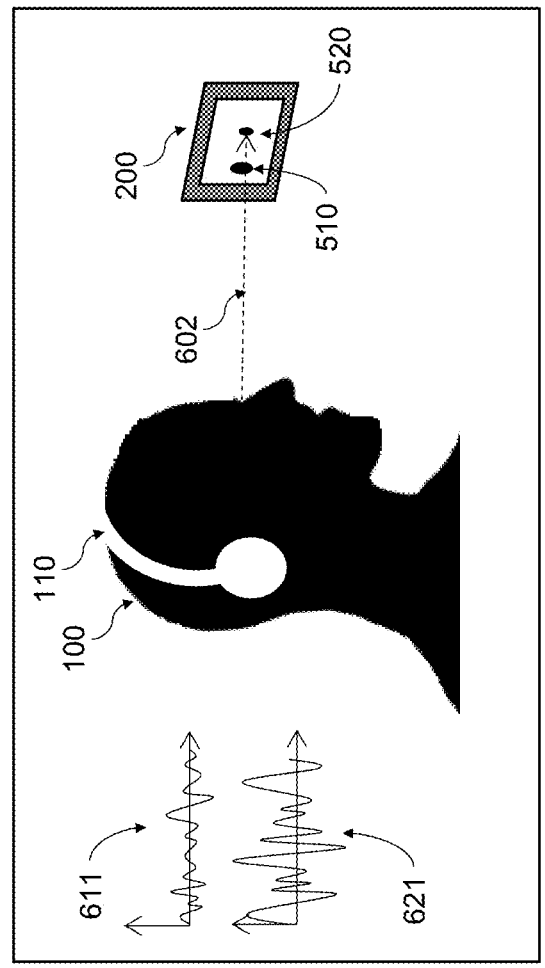

FIGS. 7A and 7B graphically illustrate an example including the effect of a change in user pose on the spatially mixed audio signals from a first object 510 and a second object 520 in a virtual environment displayed to a user 100 on a computing device 200. In this case, the user's pose is related to the position of the user's eyes (i.e., the user's gaze) with respect to the spatial positions of the first object 510 and the second object 520 within the virtual environment.

As shown in FIG. 7A, the user's gaze is directed to the first object 510. By detecting the user's eye position with respect to the spatial position of the first object 510 within the virtual environment, it may be determined that the user 100 is looking at the first object 510. Accordingly, audio from the virtual environment may be spatially mixed so that a first audio signal 610 from the first object 510 is transmitted by the sound device 110 at a larger amplitude than a second audio signal 620 from the second object 520.

As shown in FIG. 7B, the user's gaze has changed and the user is now looking at the second object 520. In this case, the audio from the virtual environment may be spatially mixed so that the second audio signal 621 from the second object 621 is transmitted by the sound device 110 at a higher amplitude than the first audio signal 611 from the first object.

FIG. 8 is a flowchart illustrating a method 700 for spatially mixing the audio based on a user's pose. The method includes receiving 710 information corresponding to a pose (e.g., head pose) of a user from one or more sensors monitoring the user. A pose of the user (or change in the pose) is then determined 720 based on the information. From the determined pose and from knowledge of the virtual environment 760, the virtual orientation of the user within the virtual environment may be determined 730. Based on the determined orientation the unmixed audio tracks 745 may be spatially mixed 740 and presented 750 to a user. This process 700 may occur in real time to dynamically change the spatial mix according to a changing virtual environment and/or the changing orientation of a user within the virtual environment.

Figure 9:
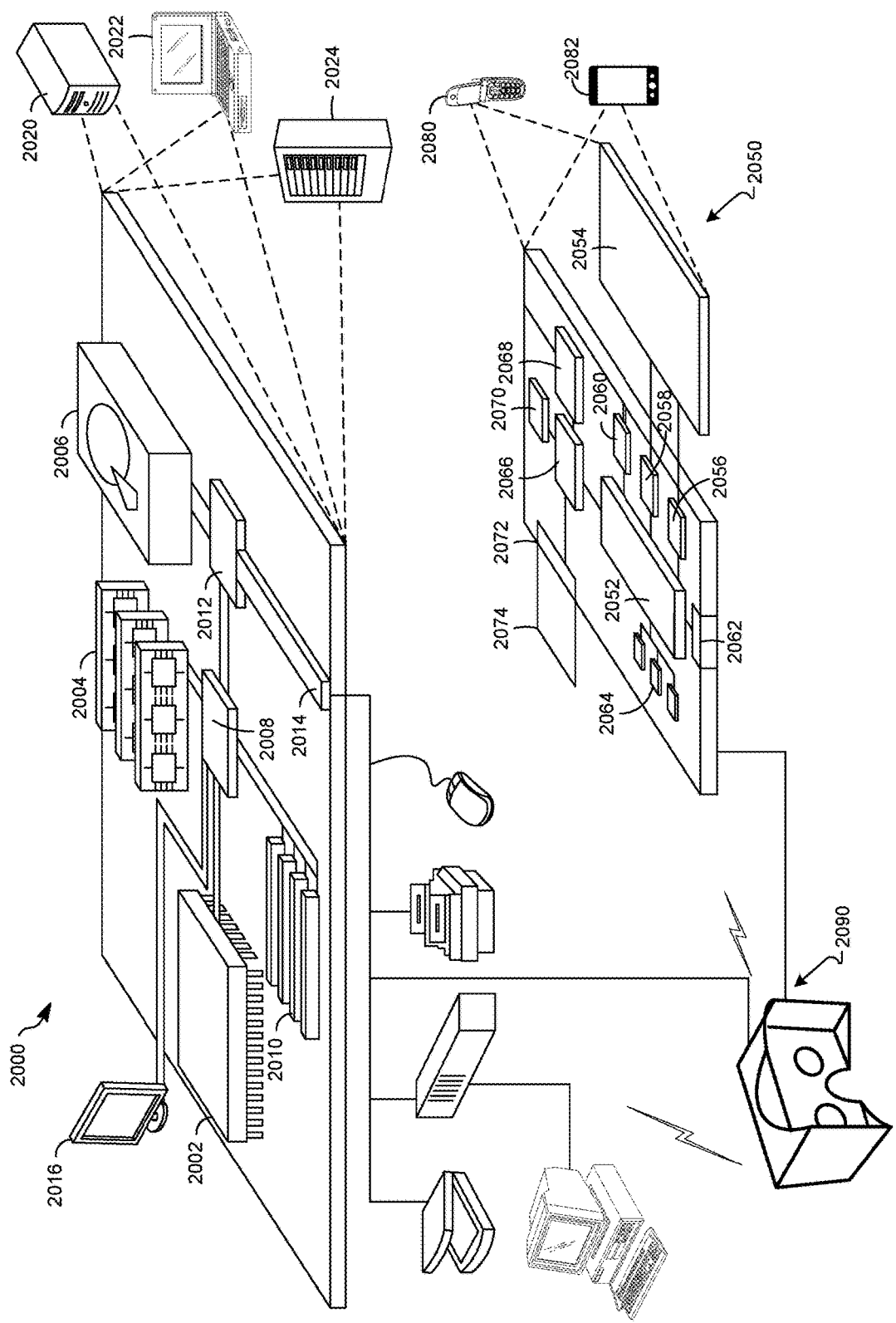
FIG. 9 shows an example of a computer device and a mobile computer device that can be used to implement the techniques described here.

FIG. 9 is a more detailed schematic of a computer device 2000 and a mobile computer device 2050, which may be used with the techniques described herein. Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wi-Fi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset/HMD device 2090). For example, one or more sensors included on a computing device 2050 or other computing device depicted in FIG. 8, can provide input to VR headset 2090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 2050 can use the sensors to determine an absolute position and/or a detected rotation of the computing device in the VR space that can then be used as input to the VR space. For example, the computing device 2050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 2050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2050 when the computing device is incorporated into the VR space can cause a particular action to occur in the VR space.

In some implementations, a touchscreen of the computing device 2050 can be rendered as a touchpad in VR space. A user can interact with the touchscreen of the computing device 2050. The interactions are rendered, in VR headset 2090 for example, as movements on the rendered touchpad in the VR space. The rendered movements can control virtual objects in the VR space.

In some implementations, one or more output devices included on the computing device 2050 can provide output and/or feedback to a user of the VR headset 2090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2050 may appear as another object in a computer-generated, 3D environment. Interactions by the user with the computing device 2050 (e.g., rotating, shaking, touching a touchscreen, swiping a finger across a touch screen) can be interpreted as interactions with the object in the VR space. In the example of the laser pointer in a VR space, the computing device 2050 appears as a virtual laser pointer in the computer-generated, 3D environment. As the user manipulates the computing device 2050, the user in the VR space sees movement of the laser pointer. The user receives feedback from interactions with the computing device 2050 in the VR environment on the computing device 2050 or on the VR headset 2090.

In some implementations, a computing device 2050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 2000 is intended to represent various forms of digital computers and devices, including, but not limited to laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving media content containing unmixed audio tracks, the unmixed audio tracks including a first audio track of a first object in a virtual environment and a second audio track of a second object in the virtual environment;
   receiving information from at least one sensor corresponding to a user and a display;
   determining a pose of the user based on the information from the at least one sensor, the pose including a relative distance between the user and the display;
   determining a first position of the first object in the virtual environment and a second position of the second object int the virtual environment;
   adjusting an audio mixer based on (i) the relative distance between the user and the display and (ii) the first position of the first object and the second position of the second object in the virtual environment, so that a difference between amplitudes of the first audio track and the second audio track is larger for a shorter relative distance between the user and the display and is smaller for a larger relative distance between the user and the display;
   applying the unmixed audio tracks to the adjusted audio mixer to create mixed audio for the media content; and
   presenting the media content to the user, the media content including the mixed audio.

2. The method according to claim 1, wherein the media content is a video.

3. The method according to claim 1, wherein the audio mixer includes an audio channel for each unmixed audio track, each audio channel of the mixer adjustable to control at least one characteristic of the applied unmixed audio track.

4. The method according to claim 3, wherein the at least one characteristic includes a volume or a spectral profile of the applied audio track.

5. The method according to claim 1, wherein the information from at the least one sensor includes at least one image of the user.

6. The method according to claim 1, wherein the pose of the user further includes a relative orientation between the user and the display.

7. The method according to claim 1, wherein the pose of the user includes an expression or a movement of the user.

8. The method according to claim 1, further comprising:
repeating the determining, the adjusting, the applying, and the presenting so that the mixed audio of the media content responds to changes in the pose of the user as the media content is played.

9. A system for mixing audio, comprising:
a display configured to display media content including a first object and a second object in a virtual environment, the first object having a first audio track and the second object having a second audio track;
at least one sensor configured to receive information corresponding to a user and the display; and
a processor that is communicatively coupled to the at least one sensor, the processor configured to:
receive unmixed audio tracks associated with the media content, the unmixed audio tracks including the first audio track and the second audio track,
determine a pose from the information corresponding to the user, the pose including a relative distance between the user and the display,
determine a first position of the first object in the virtual environment and a second position of the second object in the virtual environment,
adjust an audio mixer based on the relative distance between the user and the display and the first position of the first object and the second position of the second object in the virtual environment so that a difference between amplitudes of the first audio track and the second audio track is larger for a shorter relative distance between the user and the display and is smaller for a larger relative distance between the user and the display, and
apply the unmixed audio tracks to the adjusted audio mixer to create mixed audio for the media content.

10. The system according to claim 9, wherein the processor is further configured to transmit the media content with the mixed audio to the display and a sound device of the system.

11. The system according to claim 10, wherein the sound device is a headset.

12. The system according to claim 10, wherein the pose of the user further includes a relative orientation between the user and the display.

13. The system according to claim 9, wherein the at least one sensor includes a camera of a mobile device.

14. The system according to claim 9, wherein the at least one sensor includes a camera of a home security system or a camera of a smart home system.

15. The system according to claim 9, wherein the at least one sensor includes a camera of smart glasses worn by the user.

16. The system according to claim 9, wherein the at least one sensor includes a depth sensor.

17. A computing device comprising:
an audio interface coupled to a sound system;
a display configured to display media content including a first object and a second object in a virtual environment, the first object having a first audio track and the second object having a second audio track;
a camera configured to capture at least one image of a user; and
a processor that is communicatively coupled to the audio interface, the display, and the camera, the processor configured to:
receive unmixed audio tracks associated with the media content, the unmixed audio tracks including the first audio track and the second audio track,
determine a pose of the user from the at least one image of the user, the pose including a relative distance between the user and the display,
determine a first position of the first object in the virtual environment and a second position of the second object in the virtual environment,
adjust an audio mixer based on the relative distance between the user and the display and the first position of the first object and the second position of the second object in the virtual environment so that a difference between amplitudes of the first audio track and the second audio track is larger for a shorter relative distance between the user and the display and is smaller for a larger relative distance between the user and the display,
apply the unmixed audio tracks to the adjusted audio mixer to create mixed audio for the media content, and
transmit the media content to the display and the mixed audio to the sound system.

18. The computing device according to claim 17, wherein to determine a pose of a user from the at least one image of the user includes determining a position of a gaze of the user with respect to a position of an object within the media content.

* * * * *